United States Patent [19]

Hice

[11] Patent Number: 4,578,572

[45] Date of Patent: Mar. 25, 1986

[54] MODULAR MICROPROCESSOR-BASED SYSTEM FOR PRINTING AND READING A PERSONAL IDENTIFIER CODE ON A FORM

[75] Inventor: John R. Hice, Santa Paula, Calif.

[73] Assignee: Data Information Management Systems, Inc., Ventura, Calif.

[21] Appl. No.: 505,234

[22] Filed: Jun. 17, 1983

[51] Int. Cl.[4] .......... G06K 7/10

[52] U.S. Cl. .......... 235/472; 235/386; 235/487

[58] Field of Search .......... 235/462, 472, 383, 386, 235/487

[56] References Cited

U.S. PATENT DOCUMENTS

| | | | |
|---|---|---|---|
| 4,028,537 | 6/1977 | Snow | 235/472 |
| 4,180,204 | 12/1979 | Koenig | 235/472 |
| 4,349,741 | 9/1982 | Bobart | 235/462 |
| 4,402,088 | 8/1983 | McWaters | 235/462 |
| 4,463,250 | 7/1984 | McNeight | 235/383 |

OTHER PUBLICATIONS

IBM Tech. Discl. Bull. vol 19, No. 1, Jun. 1976, "Read/Write Stylus", E. Uberbacher.

*Primary Examiner*—Harold I. Pitts
*Attorney, Agent, or Firm*—Drucker & Sommers

[57] ABSTRACT

A modular microprocessor-based code printing and reading system, adapted to print a personal coded indentifier on a form, and to read the code from the form to generate data for processing thereof. The system is particularly adapted for use in the elections process, with the code comprising a bar code, representing an identifier assigned to the person identified, which identifier is random relative to an alphabetical listing of persons so identified.

The system includes a laser printer, microprocessor-based, operable in response to a laser control program, for printing the bar code associated with the particular person at the appropriate location on the form.

The system further includes a portable compact reader, microprocessor-based, which includes a wand adapted to sense the bar code on the form. The reader is operable in response to control by the operator, and to a reader control program, for reading the bar code, to generate data relating to the person identified thereby for processing thereof.

10 Claims, 1 Drawing Figure

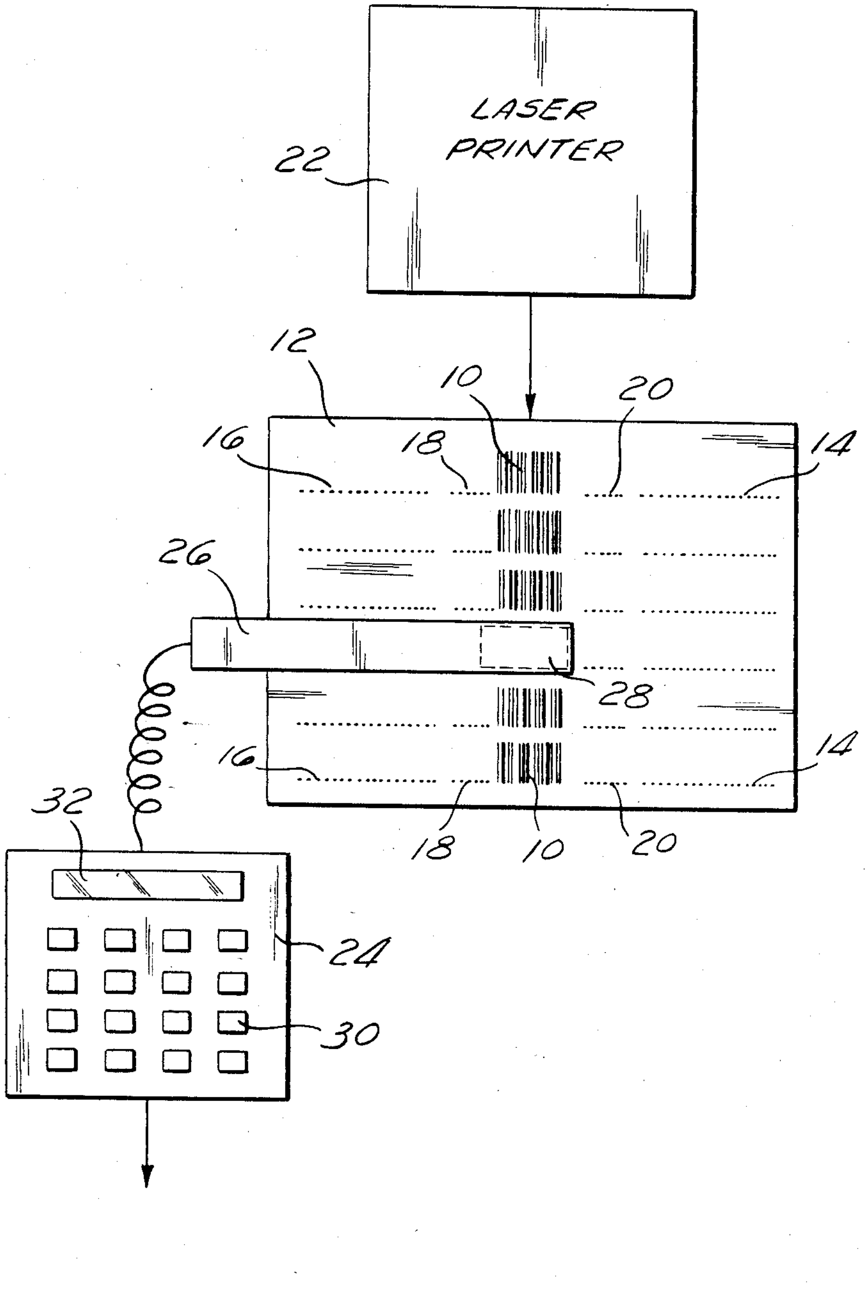
LASER PRINTER
22
12
10
20
16
18
14
26
28
16
14
32
18
10
20
24
30

MODULAR MICROPROCESSOR-BASED SYSTEM FOR PRINTING AND READING A PERSONAL IDENTIFIER CODE ON A FORM

BACKGROUND OF THE INVENTION

The invention relates generally to systems for printing and reading forms for processing of data generated thereby. It relates specifically to a modular system, microprocessor-based, for printing a coded indentifier on a form and reading the coded identifier to generate data relating to the person identified by the code.

The prior art includes systems for printing and reading forms to generate data relating to particular persons identified on the forms. Such systems included impact line printers, which printed identifying indicia on a form, such as multiple character alphanumeric codes assigned to each person identified on the form. These coded identifiers were used in forms relating to the elections process, as voter registration numbers used on roster and walking indexes, return mail, and affidavit forms.

The printed coded identifiers were read after the election manually, to generate data therefrom for further processing. Such further processing in the elections process, based on such manual reading of coded identifiers, included voter canvas, identification of voting history, and purging. Other processes based on manual reading of coded identifiers in the elections process included reviewing the return mail and affidavit forms.

Moreover, the prior art form printing systems were slow, cumbersome, and expensive. For multiple copies, the printed forms included carbon copies, which were messy to handle and difficult to process. Further, the prior art manual form reading systems were very slow, labor-intensive, and subject to significant margins of error. Such systems required large numbers of workers to work long periods of time. Thus, such systems were inaccurate, inconvenient, inefficient, and expensive to use.

SUMMARY OF THE INVENTION

The invention is adapted to overcome the above problems and others associated with the prior art. It provides a modular microprocessor-based code printing and reading system, particularly useful in the elections process. The microprocessor-based system significantly lessens the possibility of problems in the use of forms in the elections process. It enables rapid, efficient, and convenient printing of forms used in the elections process, with personal identifier codes accurately and efficiently printed thereon. It further enables rapid, economical, and efficient reading of the personal identifier codes with greater accuracy and less margin of error, for generating data for processing thereof.

The system includes a laser printer, microprocessor-based, for rapidly, economically, accurately and efficiently printing a personal bar code identifier on the form. Each bar code is assigned exclusively to a particular person, and is random relative to an alphabetized listing of all persons so identified. The laser printer is adapted to be operable responsive to a control program therefor.

A portable compact reading device, microprocessor-based, is included in the system, for accurately, economically, rapidly and efficiently reading the personal bar code identifier from the form. The reading device is adapted to be operable responsive to control by a control program therefor, and movement by the operator of a wand code-sensing portion thereof relative to the bar code on the form. The reading device enables one operator, having little technical training, to interface with the system to control system functions. It is readily and conveniently operable by a non-technical operator, not requiring a person trained in computers for use thereof, making it convenient and efficient to use. One operator can perform the work previously done manually by a large number of people, more accurately, and in significantly less time and at less expense.

DESCRIPTION OF THE DRAWING

The FIGURE is a partly-schematic block diagram of the modular code printing and reading system, pursuant to the invention.

DETAILED DESCRIPTION OF THE INVENTION

The invention, as shown in the FIGURE and as described herein, comprises a modular microprocessor-based coded-identification printing and reading system. It is adapted to print an identification code 10 on a sheet of paper which constitutes a form 12, and to read code 10 from form 12. The system is particularly adapted for use in connection with forms used in the people accountability process.

Code 10 preferrably comprises a bar code. In the bar code, the thickness of lines printed on the form, as well as of spaces provided therebetween, when properly read in combination, convert into characters in a complete identifier code. One type of bar code which may be used comprises the Uniform Product Code (UPC), in which the bar code represents numerical characters. Another type of bar code which may be used comprises the Thirty-Nine (39) Code, in which the bar code represents alphabetical and numerical characters. These bar codes can integrate thereinto pre-existing codes for control purposes.

In the elections process, the bar code 10 represents a unique number assigned to a particular voter upon entry into the system, typically upon voter registration. Such bar code 10 used in the elections process herein is a random identifier of each registered voter relative to an alphabetical list of registered voters, over a period of time. The identifier assigned by the system herein, upon entry of the voter by registration, as represented by bar code 10, is the next sequential identifier available in the series of identifiers on the date of registration, as determined by a disk management control program. Such identifier is randomized over a period of time by virtue of maintenance, wherein voters are inserted into and deleted from the voter registration rolls. Further, such identifier is directly accessible by the system herein, by virtue of the bar coding and associated software controls, without maintaining subsidiary control files containing lists of sequential identifiers and corresponding voter names. The identifier generated in bar code is read at the real address space for the individual on the disk, without any correlations to a control file. The bar code 10 is readable as a plurality of bytes, and each byte preferably includes a parity bit for self-checking and verifying the accuracy of the reading of the byte.

Further, in the elections process, form 12 may comprise a form used to determine whether or not a voter voted in an election, such as a sheet in a roster index. The roster index sheet includes a portion of the roster of voters. Each voter is identified on the sheet, for example, by the voter's name 14, alphabetized by first letter of the last name, the voter's address 16, a code identifier 18, including numerical and/or alphabetical characters, bar code 10 representing the identifier 18, and space 20 for the voter to acknowledge, as by signing, that such voter voted in the election. Such roster indexes are prepared for use at the polling places during an election, for controlling the activities of the voters, including recording whether or not a voter voted in the election. Roster indexes are used after the election by processing thereof, to conduct a canvas. A canvas consists of an audit of the election, and constitutes a comparison of the number of ballots issued against the number of signatures on the roster. Further, identification of voting histories is conducted based thereon, constituting identifying persons who did vote and persons who did not vote. A purging process is conducted based thereon, with each person who did not vote being subject, in certain jurisdictions, to removal from the voter rolls.

Other forms 12 used in the elections process for various elections-related functions include walking indexes, return mail, registration affidavits, and voting history forms. The walking index is similar in format to the roster index, but is arranged by addresses of voters, grouping together all voters on a particular street in a particular area of the voting district, useful for polling purposes. Return mail forms are addressed to each voter in the jurisdiction, to determine whether the voter still resided in the district. If such form was returned as either undeliverable, no forwarding address, moved to another jurisdiction, or for some other reason, appropriate modification of the voter rolls could be made. Registration affidavits are used at the time of entry of a voter into the system.

The modular microprocessor-based system for printing and reading code 10 on form 12, as shown in the FIGURE, includes a laser printer 22. Laser printer 22, microprocessor-based, includes a laser beam generating and directing system, for rapidly directing a laser beam, under the control of a laser control program, in very fine incremental movements against a drum. The laser beam magnetizes portions of the drum, to produce images thereon to then be transferred to the sheet of paper comprising form 12, for printing form 12 thereby.

Laser printer 22 has the capability of rapidly printing very fine definitive lines, such as those required for printing a code such as bar code 10. It is operable at very high speeds, for large volume printing production requirements. Its speed enables it to print multiple copies for use as form copies, without carbon sheets which are messy for workers in the elections process to handle and use.

Laser printer 22 is operable to rapidly, efficiently and economically produce large volume reports, such as those used in the elections process, with the personal voter identifier bar code 10 for each voter printed thereon, under the control of a laser control program. The printed bar code 10 is capable of being read electronically.

For the elections process, laser printer 22 may rapidly and efficiently print an elections booklet, such as a Combined Roster and Index for a particular precinct in a voting district. It may use multiple paper hoppers, and print a front cover sheet on both sides, with legally-required text thereon, the inside pages, such as form 12 as shown in the FIGURE, a last inside page for controlling persons not on the roster, and a back cover sheet. For such printing, the laser is operable under the control of a laser control program in the microprocessor in laser printer 22.

A portable compact code-reading device 24, microprocessor-based, is further included in the modular system. Reading device 24 includes a wand arm 26. Wand arm 26 is operable to rapidly and accurately sense the bar code 10 on form 12 associated with particular voters, under the control of an operator, in a convenient and efficient manner. It may be used, for example, in the elections process, to identify voters who did not vote in an election, by sensing, through sensing means in end 28 of wand 26, the bar code 10 associated with each space where a voter did not sign to acknowledge having voted.

Wand arm 26 enables rapid and accurate inputting of data into reading device 24, by sensing bar code 10. Wand arm 26 is preferrably comprised of a rubber housing, more wear-resistant than plastic. It preferrably includes a glass portion, protected in a projecting metal casing at sensing end 28, such that the glass does not touch the sheet of form 12 for accurate viewing, more accurate than plastic which tends to scratch and discolor. Sensing end 28, upon complete reading of bar code 10, causes an audible tone to sound. If the tone sounds, the bar code 10 has been accurately read. If the tone does not sound, bar code 10 has not been read. The operator must then rewand bar code 10, in an effort to read the code. If the tone does not sound after several re-wandings, the operator may manually key in the code identifier 18 for form 12, through keyboard 30 of reading device 24. Sensing end 28 is able to distinguish bar code 10 from other marks written thereover, such as an over-write of the voter's signature.

Reading device 24, which includes menu-driven keyboard 30, further includes an associated display 32, for manually keying in identifier 18, as backup in the event that sensing end 28 of wand arm 26 is unable to sense bar code 10, and for setting up the mode of system operation. Keyboard 30 includes keys labeled to effect specific functions, such as keys for particular elections process applications. Keyboard 30 and display 32, through a reader control program, enable various specific elections process functions to be performed, including adding to counters, keeping track of audit trails, scanning forward, scanning backward, scrolling forward and backward, and selecting data transfer rates for processing thereof. The reader control program, and any other elections-process-related software for controlling reading device 24 is preferrably etched on a programmable read-only memory. This enables efficient preparation of control programs for various political divisions, and rapid and efficient removal and replacement of the program for use of another program therein for a different political division.

Reading device 24, upon reading bar code 10, generates data for processing thereof in a rapid and efficient manner, enabling accurate and prompt completion of functions associated with the elections process. Such elections process functions, for example, may comprise a post-election canvas of the election, auditing the number of ballots issued against the number of signatures on the roster, then identifying voting history of people who did not vote, and conducting a purge of persons subject to removal from the rolls. These functions are conducted in significantly decreased time, with greater accuracy, and with significantly decreased requirements for manual labor.

The data captured by reading device 24 upon reading bar code 10 enables processing by a computer suitably programmed to perform elections process functions on a voter registration file data base. Such elections-process-related functions include determining voting history, persons eligible for purge, and/or controlling a voter canvas after the election, conducted in an efficient and economical manner. The system further enables capture of the data necessary for fulfilling the legal requirements of a particular elections-process-related application. Transfer of captured data to the computer for processing may be effected, for example, by direct connection of reading device 24 into the computer, transfer through modems over suitable communications lines, or direct input of data onto suitable storage media such as a reel of magnetic tape, then taken to a computing center for processing.

The modular system herein does not require a technically-trained computer specialist to operate. It is readily set up and used, and is modularized for convenience of operation. It preferrably uses modular high-sensitivity high-speed software programming for efficiency of operation.

A preferred embodiment of the invention has been set forth above, for the purpose of explaining the invention. However, it is to be understood that variations may be made in such embodiment, which variations are nevertheless within the scope and spirit of the invention, as set forth in the claims herein.

I claim:

1. A modular microprocessor-based apparatus for printing a unique personal identifier code on a sheet of paper, which sheet of paper comprises a form adapted for use in the elections process, which code is adapted to enable the person's file to be addressible directly without correlation to a control file, and for enabling the code to be read from the sheet of paper, to generate data associated with the person identified by the code relating to the elections process, for processing thereof for use in the elections process, comprising:

(a) means for printing the unique directly-addressible personal identifier code, assigned to the person upon registration on the elections rolls, on the sheet of elections process form paper, microprocessor-based, including means for directing a laser beam therein, adapted to be operable responsive to control by a laser control program for printing the unique directly-addressible personal identifier code on the elections process form; and (b) portable compact means for reading the unique directly-addressible personal identifier code from the elections process form, microprocessor-based, adapted to be operable responsive to control by the operator, and control by a reading control program, to generate data associated with the person identified by the code relating to the elections process, for processing thereof for use in the elections process.

2. An apparatus as in claim 1, in which the code comprises a bar code.

3. An apparatus as in claim 1, in which the reading means include a wand portion, which includes therein means for sensing the code on the sheet of paper.

4. An apparatus as in claim 1, in which the laser printing means are further adapted to provide a space associated with the person identified by the unique directly-addressible personal identifier code on the elections process form for acknowledgement by the person identified by the code.

5. An apparatus as in claim 1, in which the unique directly-addressible personal identifier code assigned to the person so identified upon registration on the election rolls is random relative to an alphabetical sequential listing of persons so identified.

6. An apparatus as in claim 2, in which the bar code is convertible into a plurality of bytes, and each byte includes means for self-checking the accuracy of the reading of the byte by the reading means.

7. An apparatus as in claim 4, in which the unique directly-addressible personal identifier form compreses a list of persons registered on the elections rolls, and includes, directly adjacent to each code, an associated space for a signature acknowledgement by the person identified by the code.

8. An apparatus as in claim 5, in which each byte includes a plurality of bits, and the self-checking means comprises a further parity bit in each byte.

9. An apparatus as in claim 6, in which each byte represents a numerical character, and the unique directly-addressible personal identifier code assigned to the person so identified upon registration on the election rolls is random relative to an alphabetical sequential listing of persons so identified.

10. A method for generating data associated with a person identified by a unique personal identifier code, for processing thereof for use in the elections process, comprising the steps of:

(a) directing a laser beam in means, microprocessor-based, for printing the unique personal identifier code, assigned to the person upon registration on the elections rolls, on a sheet of paper comprising a form adapted for use in the elections process, which code is adapted to enable the person's file to be addressible directly without correlation to a control file, responsive to control by a laser control program, with a data-base including at least the name of each person in the data base, and the repetitively generated code for each person in the data base, adapted such that no two people have the same code, and each person's name and corresponding code are in a form readable by the printing means;

(b) repetitively using portable compact microprocessor-based means, operable responsive to control by an operator and by a reading control program, to scan the unique directly-addressible personal identifier code for reading the unique directly-addressible personal identifier code from the elections process form so as to generate data associated with the person identified by the code relating to the elections process, for processing thereof for use in the elections process.

* * * * *